United States Patent [19]

Kinoshita et al.

[11] 4,112,419
[45] Sep. 5, 1978

[54] APPARATUS FOR DETECTING THE NUMBER OF OBJECTS

[75] Inventors: Hiroshi Kinoshita; Tatsuo Iwasaka, both of Katsuta; Hisao Hanmura, Hitachi, all of Japan

[73] Assignee: Hitachi, Ltd., Japan

[21] Appl. No.: 669,802

[22] Filed: Mar. 25, 1976

[30] Foreign Application Priority Data

Mar. 28, 1975 [JP] Japan .................. 50-36956
May 26, 1975 [JP] Japan .................. 50-61958
May 28, 1975 [JP] Japan .................. 50-62912

[51] Int. Cl.² .............................. G01S 9/66
[52] U.S. Cl. .................. 340/560; 340/1 R; 340/1 C; 340/19 R; 343/5 PD
[58] Field of Search ............ 340/19 R, 38 S, 258 A, 340/258 B, 258 R, 1 T, 1 C, 1 R; 343/5 PD

[56] References Cited

U.S. PATENT DOCUMENTS

| 2,629,082 | 2/1953 | Hare | 340/38 S |
|---|---|---|---|
| 3,105,953 | 10/1963 | Polster | 340/1 T |
| 3,300,768 | 1/1967 | Bystrom et al. | 340/5 PD |
| 3,416,127 | 12/1968 | Monin et al. | 340/3 |
| 3,854,132 | 12/1974 | Davies | 343/5 PD |

FOREIGN PATENT DOCUMENTS 1,336,255 11/1973 United Kingdom ............ 340/258 A Primary Examiner—John W. Caldwell, Sr.
Assistant Examiner—Joseph E. Nowicki
Attorney, Agent, or Firm—Craig & Antonelli

[57] ABSTRACT

Apparatus for detecting the number of objects such as persons in which at least one ultrasonic wave signal transmitter-receiver is used to transmit ultrasonic wave signals toward objects the number of which is to be detected, and to process waves reflected therefrom, thus determining the number of such objects existing within a predetermined area. When plural ultrasonic wave transmitter-receivers are used, they are so arranged that their detection regions are partly overlapped, thereby assuring uniform detection sensitivity over the area. A detection time is reduced by simultaneously driving the ultrasonic wave signal transmitter-receivers. The ultrasonic wave transmitter and receiver of each transmitter-receiver may be directed to different points in a target plane within a range permitting the receiver to receive reflected ultrasonic wave signals, thereby equalizing the detection sensitivity in the direction of the difference, thus improving the detection accuracy. Only one ultrasonic wave signal transmitter-receiver may be used for attaining the same effect, which is provided with one transmitter and plural receivers, or with one receiver and plural transmitters, the one transmitter or receiver and the plural receivers or transmitters being directed to respective different points in a target plane within a range permitting the receiver or receivers to receive reflected ultrasonic wave signals.

9 Claims, 32 Drawing Figures

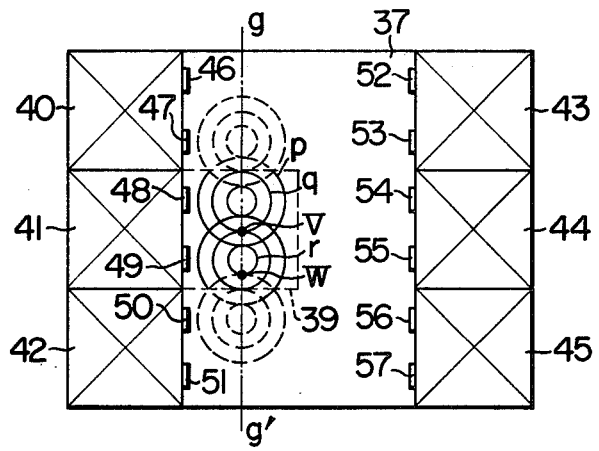
FIG. 12
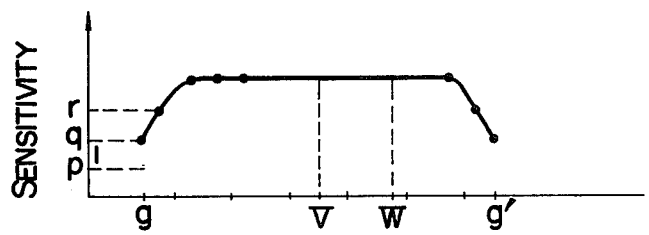
FIG. 13
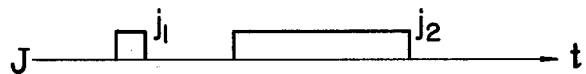
FIG. 14
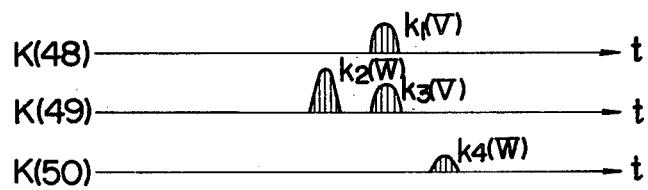

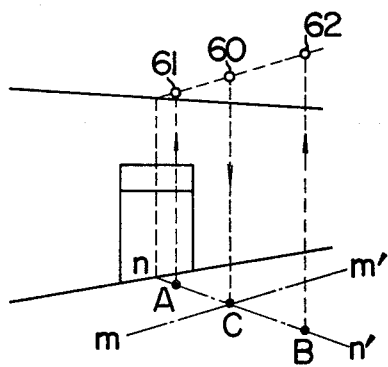
FIG. 18
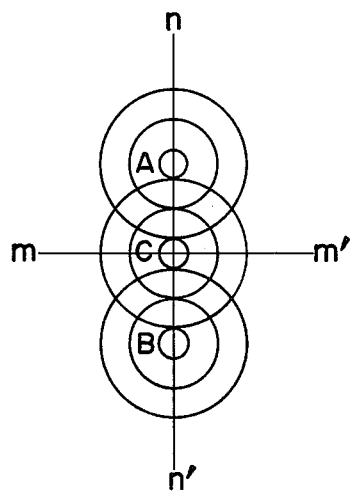
FIG. 19
FIG. 20A
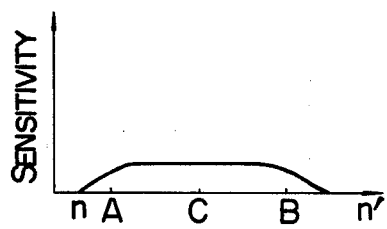
FIG. 20B
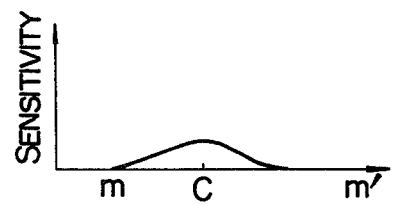

APPARATUS FOR DETECTING THE NUMBER OF OBJECTS

This invention relates to an apparatus for detecting the number of objects by the use of at least one ultrasonic or microwave transmitter-receiver.

In various fields, it is frequently requested to detect the number of objects such as persons present in a given area, automobiles in a parking lot or articles stored in a warehouse.

As a method for detecting the number of such objects, various suggestions have so far been made for use with an ultrasonic device or a microwave device. Both the ultrasonic device and the microwave device permit a similar system configuration, and a description will be made of the ultrasonic device as an example.

One of the typical applications of the ultrasonic device already commercialized is in the field of crime prevention. The ultrasonic device used for this purpose makes use of the Doppler effect and is unable to detect the number of objects but only the existence thereof. Another device already in use is a fish finder. In this device, the difference between the time required for a transmitted ultrasonic wave signal to be reflected on the bottom of the sea and return to the transmitter and the time required for such a transmitted signal to be reflected from a school of fish and return to the transmitter is utilized to detect fish. In addition, an ultrasonic wave beam with a high directivity may be swung to look for a region abundant with fish. It is impossible, though not necessary, for this device to detect the number of fishes.

As an apparatus for detecting the number of objects, there is one such for detecting the number of automobiles in a parking lot. In such an apparatus, a combination or set of ultrasonic wave transmitter and receiver (which may hereinafter sometimes be referred to as the "transmitter-receiver") is provided for each automobile, requiring as many transmitter-receiver combinations as automobiles. In order to prevent signals transmitted from the transmitter-receiver combinations from affecting each other, either the directivity of the ultrasonic wave signal produced from respective combinations must be greatly sharpened or they must be driven with different timings. Those ultrasonic wave transmitter-receivers which have detected automobiles are counted thereby to detect the number of automobiles parked. In this system, the function of each transmitter-receiver is only to detect the presence of an automobile, thus requiring the same number of transmitter-receivers as automobiles accomodated in the parking lot as explained above.

An example of an application for detecting the number of persons without using an ultrasonic wave device is disclosed in U.S. Pat. No. 2,193,5609. This is for detecting the number of passengers waiting for an elevator car on a hall and used for the purpose of elevator control. A photoelectric device is disposed at the entrance of the elevator hall and counts elevator passengers as they pass by it to detect the number of persons waiting for an elevator car in the hall. This method is practicable in a situation of a fixed pattern requiring human behaviour is incapable of application to detection of passagers in an ordinary elevator system having no hall entrance.

The above-mentioned various conventional detecting apparatuses using an ultrasonic device or a photoelectric device, as the case may be, have both merits and demerits and are not versatile enough to permit application in broader fields requiring the high-accuracy detection of the number of objects.

In view of this, a highly accurate versatile apparatus for detecting the number of objects employing an ultrasonic wave transmitter-receiver has recently been proposed. Such an apparatus is disclosed in copending U.S. patent application Ser. No. 613,500 now U.S. Pat. No. 4,023,135, assigned to the same assignee. This apparatus operates such that an ultrasonic wave signal is transmitted in a predetermined region from an ultrasonic transmitter and the wave signal reflected from objects is picked up by a receiver. The signal thus picked up is processed to detect the number of the objects by utilizing the fact that the amount of the reflected wave signal is proportional to the number of objects to be detected. Because of the inherent directivity of the ultrasonic transmitter-receiver, the detection sensitivity characteristics deteriorate toward the periphery from the center point of the detection region. Specifically, the wave signal reflected on an object located at the center of the detection region is strongest, while the intensity of the reflected wave signal is attenuated more as the objects are located farther toward the periphery from the center of the region. Therefore, assuming that the intensity of the wave signal reflected on an object near the periphery is "1", the intensity of the wave signal reflected from an object at the center thereof may be as high as "4", which results in a very low accuracy of detection of the number of objects. In the above-mentioned patent application, the waveform of the reflected wave signal is appropriately shaped to obviate the disadvantage under consideration. For this, however, a waveform shaping circuit is necessary.

Also, in the case where a plurality of ultrasonic wave transmitter-receivers are required to be provided in a location, it is considered that they have to be driven at different times to prevent mutual interference. This makes impossible simultaneous energization of the plurality of ultrasonic wave transmitter-receivers resulting in a longer time needed for detection. Further, a moving object may inconveniently be detected repeatedly, thereby adversely affecting the detection accuracy. Another shortcoming of this type of apparatus is the complexity of providing a circuit for preparing a suitable driving timing.

Accordingly, it is an object of the present invention to provide an apparatus using an ultrasonic or microwave signal which is capable of detecting the number of objects with high accuracy.

Another object of the invention is to provide an apparatus using an ultrasonic or microwave signal which is capable of detecting the number of objects present over a wide region in a short time.

Still another object of the invention is to provide an apparatus for detecting the number of objects provided with a combination of ultrasonic wave transmitter and receiver capable of effecting detection over a wide region with an improved detection accuracy.

A feature of the invention resides in that a plurality of ultrasonic wave transmitter-receivers are arranged in such a manner that their detection regions are overlapped. The addition of the outputs of all the ultrasonic wave transmitter-receivers, a uniform detection sensitivity is attained over the whole detection area of the apparatus.

A feature of invention also resides in that the mutual effect due to the overlapped situation of the detection regions of the respective ultrasonic wave transmitter-receivers is positively utilized to simultaneously energize the plurality of the transmitter-receivers.

A feature of the invention further resides in that the ultrasonic wave transmitter and receiver of each of the ultrasonic wave transmitter-receivers are directed to different points in a target plane within a range permitting the receiver to receive a reflected ultrasonic wave signal, thereby attaining a uniform detection sensitivity while at the same time enlarging the detection region of each transmitter-receiver combination. Alternatively, a transmitter or a receiver is combined with a plurality of receivers or transmitters, as the case may be, the transmitter and the receivers or the receiver and the transmitters being directed to respective different points in a target plane within a range permitting the receiver or receivers to receive a reflected ultrasonic wave, thereby attaining a uniform detection sensitivity and enlarging the detection region involved.

According to one aspect of the invention, there is provided an apparatus for detecting the number of objects comprising a plurality of transmitter-receivers, each of the transmitter-receivers including a transmitter for transmitting an ultrasonic wave or microwave signal toward the objects and a receiver for receiving the ultrasonic wave or microwave signal reflected on the objects, the transmitter-receivers being arranged to have respective detection regions overlapping each other, and means for producing a sum of the outputs of the receivers included in the plurality of transmitter-receivers.

According to another aspect of the invention, there is provided an apparatus for detecting the number of objects comprising at least one transmitter-receiver including at least one transmitter for transmitting an ultrasonic wave or microwave signal toward the objects and at least one receiver for receiving the ultrasonic wave or microwave signal reflected from the objects, the transmitter and receiver being directed to different points in a target plane within a range permitting said receiver to receive the reflected ultrasonic wave or microwave signal.

The present invention will be apparent from the following detailed description taken in conjunction with the accompanying drawings, in which:

FIGS. 1A and 1B diagrammatically show an ultrasonic transmitter-receiver installed on the elevator hall;

FIGS. 8 to 11 are diagrams for explaining the principle of the invention, in which;

FIG. 8 is a diagram for explaining the directivity of the ultrasonic wave transmitter-receiver;

FIG. 9 is a plan view showing an elevator hall provided with the ultrasonic wave transmitter-receiver;

FIG. 10 is a diagram showing the sensitivity characteristic of the transmitter-receiver of FIG. 9; and FIG. 11 shows signal waveforms produced from the transmitter-receiver of FIG. 9;

FIGS. 12 to 14 are diagrams for explaining an embodiment of the present invention, in which:

FIG. 12 is a plan view of an elevator hall showing an example of the arrangement of the ultrasonic transmitter-receiver;

FIG. 13 shows the detection sensitivity characteristic taken along the line g—g' in FIG. 12; and FIG. 14 is a diagram showing waveforms of signals produced from the transmitter-receiver of FIG. 12;

FIGS. 15 to 17D are diagrams for explaining still another embodiment of the invention, in which:

FIG. 15 is a perspective view of an elevator hall showing another example of the arrangement of the ultrasonic wave transmitter-receiver;

FIG. 16 is a diagram showing the sensitivity characteristic of the transmitter-receiver as it is arranged as shown in FIG. 9; and FIGS. 17A to 17D are diagrams showing the sensitivity characteristic of the transmitter-receiver as it is arranged as shown in FIG. 15;

FIGS. 18 and 19 are diagrams for explaining still another embodiment of the invention, in which:

FIG. 18 is a perspective view of an elevator hall showing still another example of the arrangement of the ultrasonic wave transmitter-receiver; and FIG. 19 shows the detection sensitivity characteristic of the transmitter-receiver of FIG. 18;

FIGS. 20A and 20B are diagrams showing the sensitivity characteristics taken along the lines n—n' and m—m' in FIG. 19 respectively;

FIGS. 21 to 23B are diagrams for explaining a further embodiment of the invention, in which:

FIG. 21 is a perspective view of an elevator hall showing a further example of the arrangement of the ultrasonic wave transmitter-receiver;

FIG. 22 shows the sensitivity characteristic of the transmitter-receiver of FIG. 21; and FIGS. 23A and 23B are diagrams showing the sensitivity characteristics taken along the lines n—n' and m—m' in FIG. 21 respectively.

An apparatus for detecting the number of objects by the use of an ultrasonic transmitter-receiver or a microwave transmitter-receiver is disclosed in the aforementioned copending application. The apparatus will therefore be described only briefly below. By way of explanation, in view of the same principle on which the detection of the number of objects is effected by the ultrasonic wave transmitter-receiver and the microwave transmitter-receiver, description below will be made only with reference to the ultrasonic wave transmitter-receiver. Further, passengers of elevator cars who are waiting for elevator cars on an elevator hall will be taken as an example of the objects the number of which is to be detected.

Figure 1A:
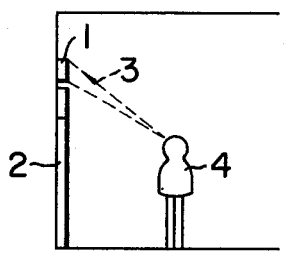
Figure 1B:
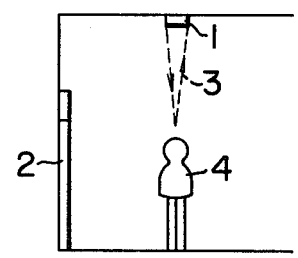
Figure 2:
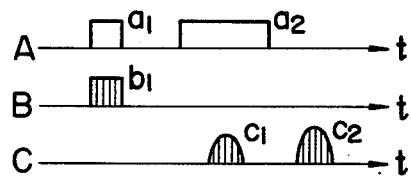
FIG. 2 is a diagram showing signal waveforms produced from the transmitter-receiver of FIG. 1.

A set of ultrasonic wave transmitter and receiver is installed on the upper side of each elevator door or on the ceiling of the elevator hall to transmit an ultrasonic wave signal obliquely or in a vertical direction. The ultrasonic wave signal thus transmitted is reflected on the floor of the hall, waiting passengers, and/or the rear wall and received by the ultrasonic wave receiver. Only the signals reflected on the waiting passengers are discriminated and used as a basis for detecting the number of the waiting passengers. In other words, the fact that the number of waiting passengers is proportional to the amount of wave signals reflected from them is utilized. Schematic diagram showing such an arrangement of the elevator hall are shown in FIGS. 1A and 1B. The diagram of FIG. 1A shows a case in which the ultrasonic wave transmitter-receiver 1 is installed on the upper side of the elevator car door 2, while FIG. 1B shows a case in which the transmitter-receiver 1 is arranged on the ceiling of the elevator hall. In FIGS. 1A and 1B, like numerals denote like component elements. Reference numeral 3 shows the ultrasonic wave signal transmitted toward the waiting passenger 4 and that reflected from him. The waveforms of these signals are as shown in FIG. 2, in which the voltage and time are plotted vertically and horizontally respectively. Reference character A shows a waveform of the timing signal for driving the transmitter-receiver: in which $a1$ and $a2$ show the timing gate signals for transmission and receipt of the ultrasonic wave signals respectively. As already explained, only the wave reflected from the waiting passenger is received. Character B shows a waveform of the transmitted signal, which is transmitted only in the presence o the signal $a1$. Character C shows a waveform of the signals received, of which $c1$ and $c2$ are signals reflected from and received from the waiting passenger and the opposite wall respectively. As shown, the ultrasonic wave signal reflected from an object located farther from ultrasonic wave transmitter-receiver naturally returns later. In this way, it is possible to identify the signal reflected from the waiting passenger by detecting only the signal $c1$ covered by the gate $a2$ among all the signals included in the received waveform C. The number of passengers waiting on the elevator hall is thus detected.

In an ordinary elevator hall, a number of elevators cars are arranged in juxtaposition. Such an elevator hall is large in area and it is impossible to detect the whole number of waiting passengers only with one transmitter-receiver set. In such a case, it is necessary to provide a plurality of ultrasonic wave transmitter-receivers such as explained with reference to FIG. 1. Because of interference among the ultrasonic wave transmitter-receivers, however, the ultrasonic wave signal transmitted from the transmitter of one set is often received by the receiver of another set, thus making accurate detection difficult. To avoid this adversity, it is generally required that the transmitter-receivers be driven sequentially at different timings.

The foregoing description is concerned with an outline of the apparatus for detecting the number of objects proposed recently, and specific circuits used for such an apparatus will be described below with reference to FIGS. 3 to 7.

Figure 4:
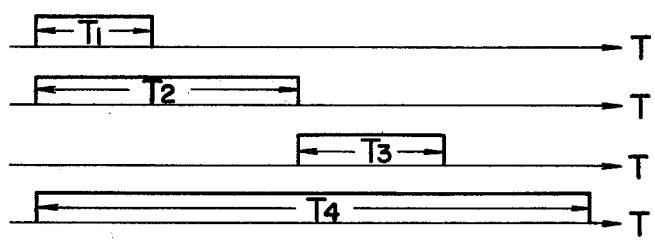
FIG. 4 is a diagram for explaining the timing of driving the transmitter-receiver.
Figure 5:
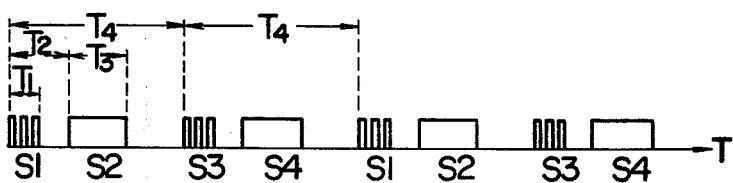
FIG. 5 shows a waveform of the timing gate signal produced from the circuit of FIG. 3.
Figure 3:
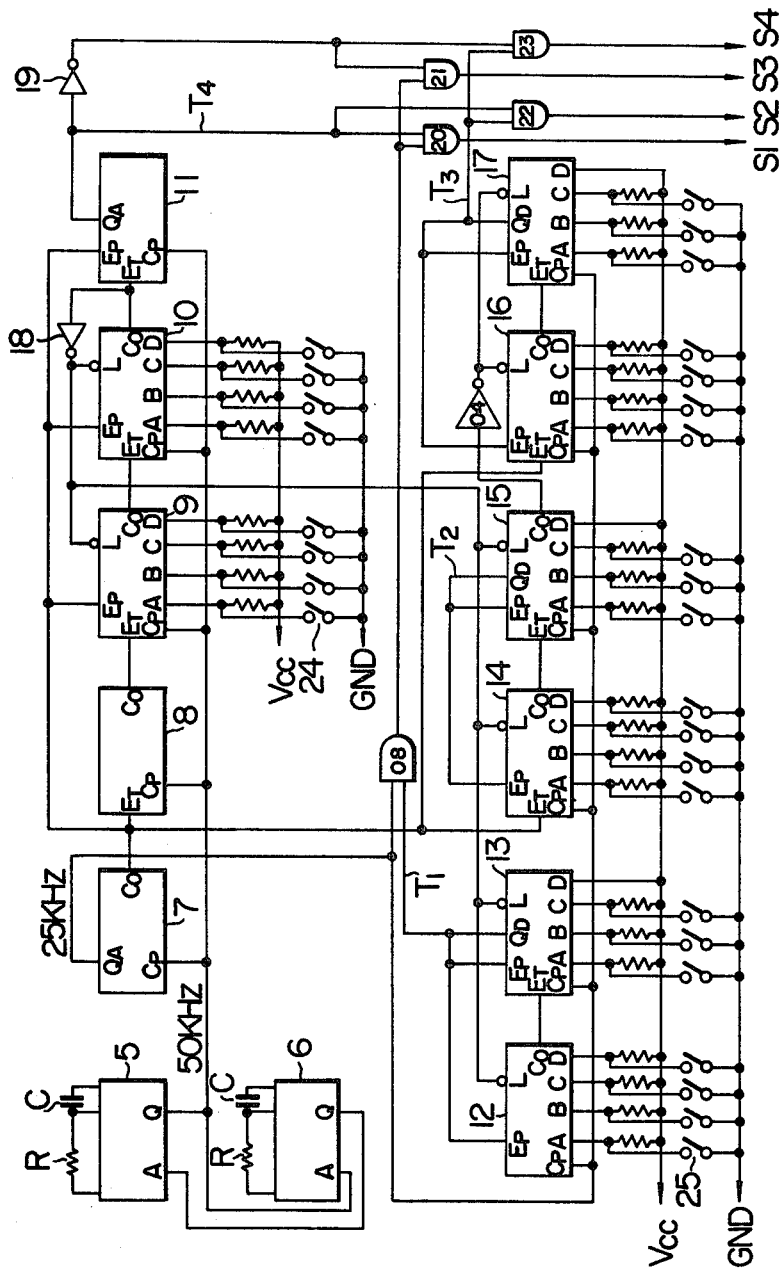
FIG. 3 shows an embodiment of a timing signal generator.
Figure 6:
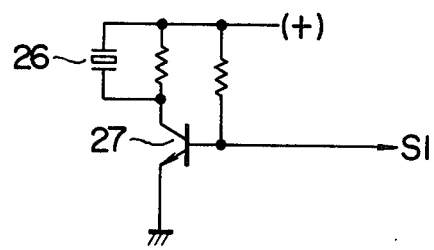
FIG. 6 is a diagram showing an embodiment of a circuit for driving the ultrasonic wave transmitter-receiver.
Figure 7:
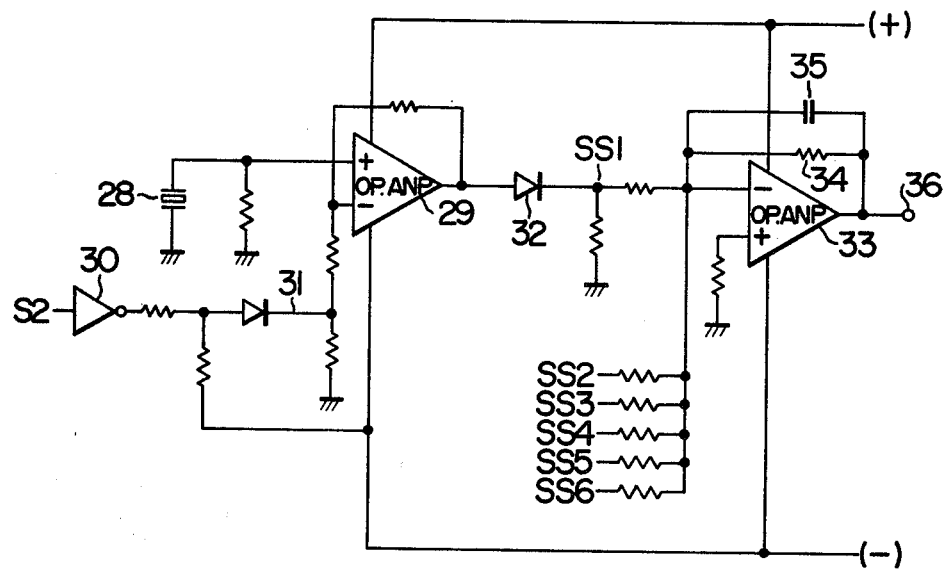
FIG. 7 shows an embodiment of the receiver circuit of the ultrasonic wave transmitter-receiver.

A timing signal generator circuit is shown in FIG. 3. In order to drive two sets of ultrasonic wave transmitter-receivers at different timings, two sets of timing signals are generated. As described above, if a plurality of transmitter-receivers are to be energized, a plurality of different timing signals are required. The diagram of FIG. 4 illustrates the relation of the timing among the signals generated in the circuit of FIG. 3. The diagram of FIG. 5 shows timing gate signals obtained finally by the circuit of FIG. 3 and applied to the ultrasonic wave transmitter-receivers. In FIG. 6 there is shown a circuit for driving the ultrasonic wave transmitter, and FIG. 7 illustrates a receiving circuit of the ultrasonic receiver.

The operation of the circuit of FIG. 3 will be explained below. By way of explanation, the ultrasonic wave oscillation frequency of the present apparatus is assumed to be 25 KHz. This circuit makes use of widely-used digital integrated circuits. Reference numerals 5 and 6 show monostable multivibrators, numerals 7 to 17 counters, numerals 18 and 19 inverters, and numerals 20 to 23 AND gates. Reference characters QA, A and CP and like noted in the integrated circuits show the natures of the terminal input and output signals. By employing the two monostable multivibrators, a rectangular wave of 50 KHz is generated, which signal is applied to the clock pulse input terminals CP of all the counters thereby to provide the timing of the circuit as a whole. The counter 7 is for counting the clock pulses, and upon the counting of 16 clock pulses, the terminal Co is raised to a high level, followed by being reset for the next counting operation. The signal level at the output terminal QA undergoes changes at a time interval twice as long as the clock pulses and takes the form of a rectangular wave of 25 KHz. The counter 8, which similarly counts the clock pulses, performs the counting operation only when the output signal at the terminal ET is at high level. Therefore, upon completion of counting 16 output pulses from the output terminal Co of the counter 7, the output signal at the output terminal Co is raised to high level. The counter 9 operates in similar fashion such that when the signal at the load terminal L is reduced to a low level, predetermined signal levels are initially set in the level-setting terminals A, B, C and D. In the case where the terminals A, B, C and D are all set at a low level, the time required for the output terminal Co to change to a high level is considered the same as in the counters 7 and 8. If the terminal A is set at a low level and terminals B, C and D at a high level, on the other hand, the change of the load terminal to a low level causes the above-mentioned signal level to be set. As a result, once the terminal Co of the counter 8 changes to a high level, the signals of the counter 9 become high, thus raising the terminal Co to a high level. Therefore, by changing the set level by means of a switch device 24, it is possible to make variable the time from the starting of a counting operation by the counter 9 to the raising of the output signal at the terminal Co. The counter 10 operates in the same manner as the counter 9, except that the shifting of the signal at the output terminal Co thereof causes the signal to be reversed through the inverter 18, thereby reducing the signals at the load terminals of the counters 9 and 10 to a low level. Further, the signal levels of the load terminals of the counters 12, 13, 14 and 15 (described later) are also reduced to a low level. The counter 11 is for counting the pulses applied to the terminal CP when ET and EP are at a high level. This is equivalent to the counting of the pulse applied to ET. Thus the output at the terminal QA remains at a low level from the starting of the counting operation of the counter 7 till the change in the output level of the terminal Co of the counter 10 to a high level, while it shifts to a high level in response to the change in the output at the terminal Co of the counter 10 upon the starting of the counting operation by the counter 7. This shift between high and low levels is repeated. On the assumption that the shifting between high and low levels is repeated at time intervals of $T_4$, the operation of the counters 12 and 13 will be explained below.

When the terminal Co of the counter 10 changes to a high level, the load terminals L of the counters 12 and 13 change to a low level, so that the signal level set by the switch is loaded in the counters, which begin to count pulses from the set signal level. Since the terminal D of the counter 13 is always at a high level, the application of a load signal thereto always causes the signal QD of the counter 13 to change to a high level. Both the terminals EP of counters 12 and 13 change to a high level, thus initiating the counting function of the counters 12 and 13. The counters 12 and 13 begin to count the clock pulses of 25 KHz. Upon full counts, i.e., when the output terminals QA, QB, QC and QD (not shown) of the counters 12 and 13 are all switched to a high level, they are reset by the next-arriving clock pulse. In this way, the terminls QA, QB, QC and QD are reduced to a low level. The terminal QD of the counter 13 is changed to a low level, thereby causing the terminals EP of the counters 12 and 13 to be reduced to a low level. The counting ability of the counters 12 and 13 is lost thereby to suspend their counting operation till the arrival of the next load signal. The time interval $T_1$ of the operation of the counters is rendered variable by the operation of the switch 25. The operation of the counters 14 and 15 is substantially the same as that of the counters 12 and 13. Since the output signal at the output terminal Co of the counter 7 is applied to the terminal Er of the counter 14, however, the counter 14 counts the clock pulses only during the period of a high level of the signal produced at the terminal $E_T$. As a result, the counter 14 counts the output pulses of the output terminal Co of the counter 7. The pulses produced at the output terminal Co of the counter 7 have intervals 16 times longer than those of the clock pulses of 50 KHz, and therefore the time interval $T_2$ of the signal from the counter 15 is 16 times longer than $T_1$.

The operation of the counters 16 and 17 will be explained below.

The counters 16 and 17 operate substantially in the same manner as the counters 14 and 15. Since the load signal is applied by way of the terminal Co of the counter 15, however, the counting operation of the counters 16 and 17 begins at the time point when the counting time interval $T_2$ of the counters 14 and 15 ends and is reduced to a low level. The time interval during which the counters 16 and 17 operate is assumed to be $T_3$.

The time interval signals $T_1$ to $T_4$ explained with reference to FIG. 3 are shown in FIG. 4, in which time and signal level are plotted horizontally and vertically respectively. As explained above, the time intervals associated with the signals $T_1$ to $T_4$ may be rendered variable by the operation of the switches 24 and 25. In the circuit configuration of FIG. 3, the time interval $T_1$ may be made variable between 20 microseconds to 2.56 milliseconds, $T_2$ and $T_3$ from 320 microseconds to 41 milliseconds, and $T_4$ from 5.12 milliseconds to 1.31 seconds.

FIG. 5 shows signals produced to be supplied to the ultrasonic wave transmitter and receiver, on the basis of signals $T_1$ to $T_4$. The signals thus produced make up the final output signals S1 to S4 in the circuit of FIG. 3. The signals S1 and S3 are the result of a logical AND of the signal $T_1$ and the 25 KHz signal and are in the form of a signal oscillating during the time interval of $T_1$. This oscillation signal is used to drive the ultrasonic wave transmitter. The signals S2 and S4 are the same as the signal $T_3$ and used as a gate signal for selecting only the signal wave reflected from waiting passengers among all the reflected ultrasonic wave signals. The signals S2 and S4 are thus used as a receiving circuit of the ultrasonic wave receiver. The signals S1, S2, S3 and S4 are classified into two groups; one including S1 and S2, and the other including S3 and S4, which groups of signals are alternately produced at the time intervals of $T_4$. This alternate operation of the signals is utilized by the invention, as described later, for the purpose of preventing interference of signals from a plurality of transmitter-receivers placed on both sides of the elevator hall by alternating the energization of the transmitter-receivers on one side with that of the transmitter-receivers on the other side.

A circuit for driving the ultrasonic transmitter-receivers is illustrated in FIG. 6. Reference numeral 26 shows an ultrasonic wave transmitter with the oscillating frequency of 25 KHz. Upon application of the signal of 25 KHz to the terminal S1, the transistor 27 is repeatedly turned on and off at the frequency of 25 KHz, so that the ultrasonic wave transmitter 26 oscillates during the time $T_1$ described above.

Referring to a receiving circuit for the ultrasonic wave receiver, reference numeral 28 of FIG. 7 shows an ultrasonic wave receiver with the receiving frequency of 25 KHz. The signal received at the ultrasonic wave receiver 28 is amplified at the operational amplifier 29. It has already been explained that, in order to make effective only those signals reflected from the waiting passengers, the amplifying operation of the operational amplifier 29 is required to be rendered effective only when the signal S2 remains at a high level. When the signal S2 is at a high level, the output signal of the inverter 30 is reduced to a low level. Since the point 31 is not affected by the circuit operation, the operational amplifier 29 effects a normal amplifying operation. When the signal S2 becomes low, by contrast, the output signal of the inverter 30 is raised to a high level, so that current flows toward the negative electrode (−) of the power supply, thus making the point 31 positive in polarity. Accordingly, a positive potential is applied to the input terminal (−) of the amplifier 29, with the result that the output thereof is saturated negatively. As to the output signal of the diode 32 connected to the output side of the operational amplifier 29, namely, the input signal SS1 to the operational amplifier 33, it takes the form of a signal received and amplified, when the signal level S2 is high; while no signal is produced from the diode 32 when the signal S2 is at a low level.

Assume that six ultrasonic wave transmitter-receivers are installed on one elevator hall. It is possible to obtain a signal proportional to the number of waiting passengers from the signals reflected by them by the summing-integration of the signals SS2 to SS6 which are similar to the signals handled in the previous case. This function of the summing integration is performed by the operational amplifier 33. As is well known, signals summed are applied to the input terminals of the operational amplifier 33, while on the other hand the output and input terminals thereof are interconnected by a resistor 34 and a capacitor 35, thus making possible the function of the summing integration. As will be seen from the foregoing description, if a fixed signal is received from wherever a waiting passenger is located in an area covered by the ultrasonic wave transmitter-receivers installed in the elevator hall, the signal level of the output signal produced at the terminal 36 of FIG. 7 is proportional to the number of waiting passengers.

Figure 8:
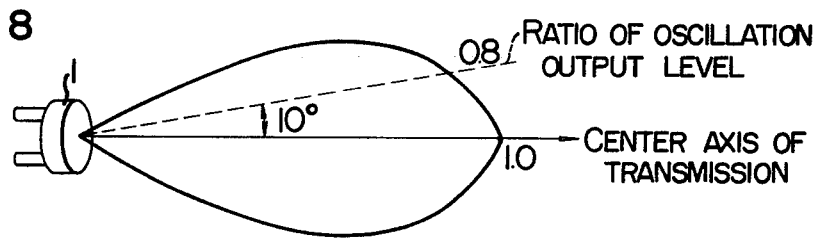

Generally, an ultrasonic wave element has a directivity, the directivity of the ultrasonic wave transmitter being shown in FIG. 8. Let the level of the oscillation output along the direction in which the transmitter is directed or the center axis of the transmission be 1.0. An oscillation output of the level of only 0.8 is transmitted in the direction at an angle of 10° to the center axis. Thus the oscillation output decreases with the distance from the center axis. The receiving characteristics of the ultrasonic receiver have also a similar directivity to that of the transmitter. Namely, although it is highly sensitive to the ultrasonic wave signal returning to it along the center axis thereof, the receiving sensitivity is lower for the reflected wave returning in a direction deviated from the center axis.

Figure 9:
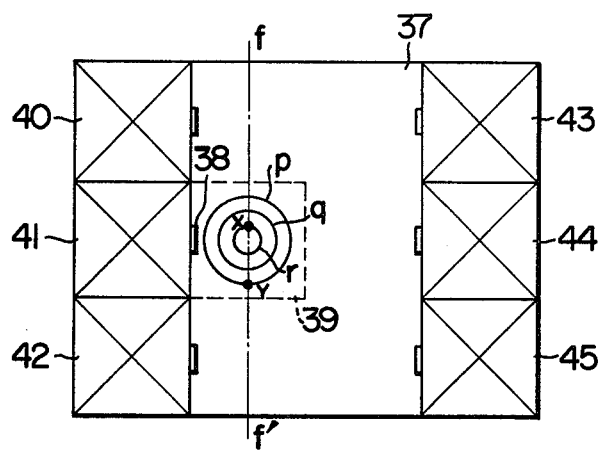

In FIG. 9 showing a plan view of an elevator hall and landing, reference numeral 37 shows an elevator hall, numeral 38 an ultrasonic transmitter-receiver, numeral 39 a detection region to be covered by the ultrasonic wave transmitter-receiver, and numerals 40 to 45 elevator shafts. In the above-described systems recently proposed, an ultrasonic wave transmitter-receiver set is provided for each elevator car, and the detection regions of respective transmitter-receivers are not overlapped to prevent duplex detection. Thus, the directivity of the ultrasonic wave transmitter-receiver as shown in FIG. 8 causes a difference in the detection sensitivity at different parts of the same detection region. In the event that the ultrasonic wave transmitter-receiver is disposed with its center axis directed toward the center of the detection region 39, the detection sensitivity is distributed almost concentrically as illustrated by $p$, $g$ and $r$. The detection sensitivity is highest at and around the center and decreases with the distance from the center toward the circle $p$.

Figure 10:
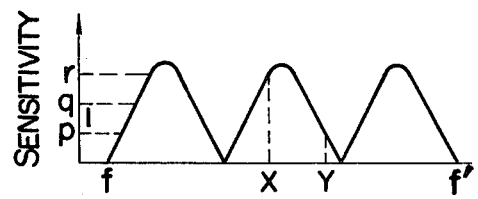
Figure 11:
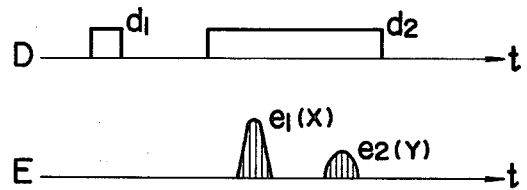

Assuming that an ultrasonic wave is transmitted obliquely from an upper side as shown in FIG. 1A, the detection sensitivity is, strictly speaking, distributed over an almost elliptic area. This is because the sensitivity is a function of distance, so that the longer the distance, the lower the sensitivity. For convenience' sake, however, the explanation below assumes that the equal detection sensitivity is distributed over a concentric circle. Of course, this affects in no way the scope and spirit of the invention. FIG. 10 shows the sensitivity characteristic as taken along the line $f\text{-}f'$ in FIG. 9. As is obvious from FIG. 10, the above-mentioned method of arrangement has the disadvantage of the sensitivity varying greatly from one point to another in the same detection region, resulting in a considerable reduction in the detection accuracy. Waveforms of signals reflected on passengers waiting at points X and Y in FIG. 9 are shown in FIG. 11. These waveforms are similar to those shown in FIG. 2. Reference character D shows waveforms of timing signals like A in FIG. 2 and character E waveforms of received signals similar to C in FIG. 2.

Symbol e1 shows a waveform of a signal reflected on and returned from the waiting passenger at point X, and e2 that of a signal received from the waiting passenger at point Y. As shown in FIGS. 9 and 10, the detection sensitivity at points X and Y is associated with the concentric circles $r$ and $p$, respectively. A signal high in level is received from a waiting passenger at a point with a high detection sensitivity such as point X, while the level of the signal received from a waiting passenger present at a point low in detection sensitivity is correspondingly low. Suppose that the signal e2 is set at a level representing one waiting passenger. Then, the signal level e1 represents two waiting passengers. As a result, an output is produced as if there are two waiting passengers at point X even though there is only one, thus greatly reducing the detection accuracy of the apparatus.

The present invention was made in view of the above degraded detection accuracy. The fundamental principle and an embodiment of the invention will be explained below with reference to FIGS. 12 to 14.

A plan view showing an example of the arrangement of two ultrasonic wave transmitter-receivers for each elevator car is shown in FIG. 12. In this Figure, like numerals denote like component elements in FIG. 9. Numerals 46 to 57 show ultrasonic wave transmitter-receivers two sets of which are allotted to each elevator car. This Figure is depicted with primary emphasis placed on the ultrasonic wave transmitter-receivers 48 and 49 covering the detection region 39 for the elevator car shaft 41. The detection sensitivity of each of the ultrasonic wave transmitter-receivers 48 and 49 is represented by concentric circles similar to the ones $p$, $q$ and $r$ as shown in FIG. 9. As is seen from the drawing, the present invention is such that the detection regions of respective ultrasonic wave transmitter-receivers are overlapped thereby to positively detect the same object twice or doubly. By thus positively taking advantage of the double detection and mutual effect or interference, the simultaneous energization of a plurality of transmitter-receivers is made possible. The overall detection sensitivity of the apparatus according to the invention is expressed as a sum of the sensitivity (in decibels) of individual transmitter-receivers. The sensitivity characteristic taken along the line $g\text{—}g'$ in FIG. 12 is illustrated in FIG. 13, in which the abscissa and ordinate represent sensitivity and points on the line $g\text{—}g'$, respectively. As explained above, the detection sensitivity at a given point on the line $g\text{—}g'$ is a sum of the sensitivities associated with the circles $p$, $q$ and $r$. Excepting those parts of respective detection regions not overlapped at the peripheries, the sensitivity is uniform over the whole region, with the result that the sensitivity characteristic is greatly improved as compared with the sensitivity characteristic shown in FIG. 10. The diagram of FIG. 14 shows, in similar manner to FIG. 2, waveforms of signals reflected on and received from waiting passengers at points V and W in FIG. 12, reference character J showing a timing signal waveform.

Symbol K(48) shows a waveform of the signal received by the ultrasonic wave transmitter-receiver 48 shown in FIG. 12. Symbol $k_1(V)$ shows a waveform of a signal reflected from the waiting passenger at point V of FIG. 12 and received by the receiver of the ultrasonic wave transmitter-receiver 48. Symbols $k_2(W)$ and $k_3(V)$ in the waveform K(49) show signals reflected from the waiting passengers at points W and V and received by the receiver 49. The receiver 49 is located nearer to the waiting passenger at point W than to the waiting passenger at point V and therefore receives the signal from the waiting passenger at point W earlier than that from the waiting passenger at point V. As explained earlier with reference to the receiving circuit of FIG. 7, the number of passengers waiting in a hall is determined by the summing integration of signals received by respective receivers. Therefore, the signal level obtained by the summing integration of signals $k_1(V)$ and $k_3(V)$ is substantially the same as that derived from the summing integration of the signals $k_2(W)$ and $k_4(W)$. Consequently, there is little difference between the levels of the signals received from the waiting passengers at points V and W, thus eliminating the variation in sensitivity with different points in the detection area. From this, it will be understood that a signal level representing two waiting passengers is obtained by the summing integration of signals $k_1(V)$, $k_2(W)$, $k_3(V)$ and $k_4(W)$.

The foregoing description was made on the assumption that the ultrasonic wave signal transmitted from the ultrasonic wave transmitter-receiver 49, for instance, is received only by the same transmitter-receiver 49 after being reflected from the waiting passenger. Actually, however, the ultrasonic wave signal transmitted from the transmitter-receiver 49 may be received also by an adjacent transmitter-receiver. In the sensitivity characteristics of FIG. 14, the sensitivity of the transmitter-receiver 49 associated with point V, for example, is such that the ultrasonic wave signals transmitted to the point V are all reflected and return to the receiver of the transmitter-receiver 49. In the case of irregular reflection, however, the detection sensitivity is reduced accordingly. Any ultrasonic wave signals transmitted by the transmitter-receiver 49 and received by the adjacent receivers of the transmitter-receiver 48 or 50 are irregularly reflected portions of the signals of the transmitter-receiver 49, thus contributing to an equivalently uniform detection sensitivity over the whole detection area.

Figure 15:
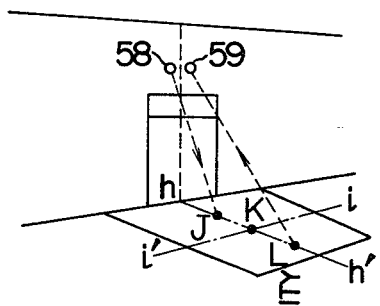

The embodiment mentioned above deals with the case in which the transmitter of each transmitter-receiver is directed to the same point in a target plane to which the receiver thereof is directed. By taking advantage of the directivity of the transmitter-receiver shown in FIG. 8, however, each set of transmitter-receiver may be arranged in such a manner that the transmitter is directed to a point in a target plane different from a point in the same plane to which the receiver is directed, within a range permitting the receiver to receive a reflected ultrasonic wave, as shown in FIG. 15, thus achieving a uniform detection sensitivity characteristic within the detection region involved. It is of course possible to arrange a plurality of transmitter-receivers configured as above, in such a manner that their respective detection regions overlap each other to attain a more uniform sensitivity characteristic over the entire detection area.

With reference to FIGS. 15, 16 and 17, an explanation will be made of the detection sensitivity characteristic of the case in which the transmitter and the receiver of a transmitter-receiver are directed to different points in a target plane within a range permitting the receiver to receive a reflected ultrasonic wave.

Figure 16A:
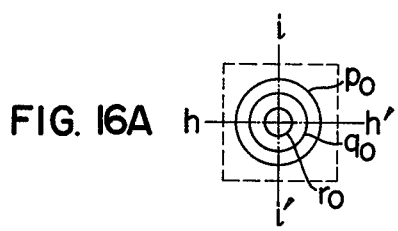
Figure 16B:
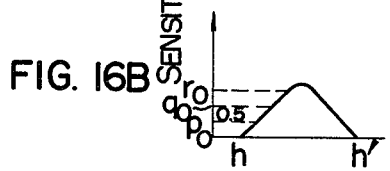
Figure 16C:
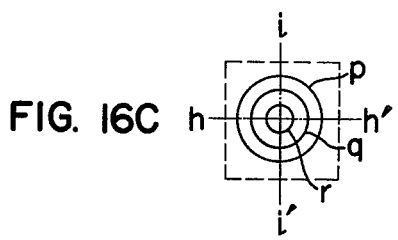
Figure 16D:
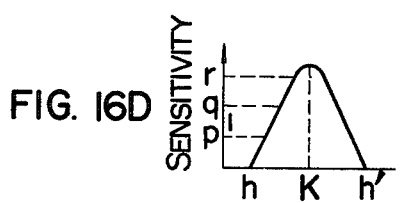

FIGS. 16A to 16D show the sensitivity characteristic of each of the transmitter and the receiver of an ultrasonic transmitter-receiver and that of the transmitter-receiver in the case of the transmitter and the receiver being directed to point K (FIG. 15) as previously explained. The equal-sensitivity curves of the sensitivity characteristic of the transmitter or the receiver is shown in FIG. 16A, and the sensitivity characteristic along the line $h$—$h'$ are illustrated in FIG. 16B. All figures are expressed in decibels and on the same scale as in FIGS. 10 and 13. Even though the equal-sensitivity circular lines are actually elliptic as mentioned earlier, concentric circles are shown for convenience' sake. FIGS. 16C and 16D show the equal-sensitivity lines and the sensitivity characteristic of a transmitter-receiver with its transmitter and receiver both directed to point K. The sensitivity characteristic shown in FIG. 16D is identical with those of FIG. 10.

Figure 17A:
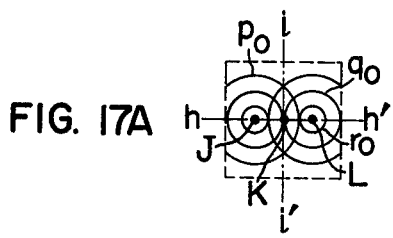
Figure 17B:
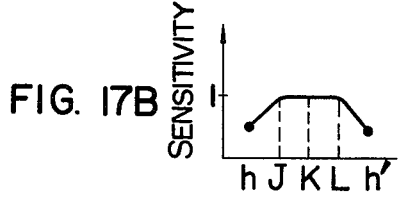
Figure 17C:
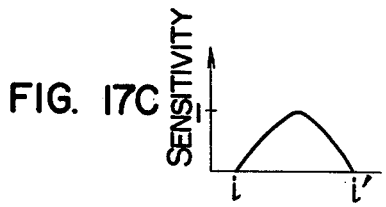
Figure 17D:
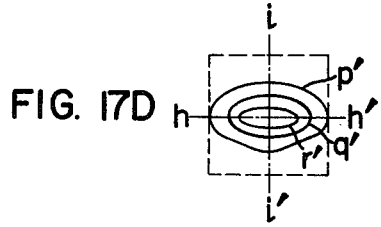

FIGS. 17A to 17D show the equal-sensitivity lines and the sensitivity characteristic of the transmitter-receiver as its transmitter and receiver are directed to points J and L (FIG. 15) respectively. The overlapped conditions of the equal-sensitivity lines of the transmitter and the receiver are illustrated in FIG. 17A. FIG. 17B shows the sensitivity characteristic along the line $h$—$h'$ in FIG. 17A, while FIG. 17C shows the sensitivity characteristic curve along the line $i$—$i'$ of FIG. 17A. FIG. 17D shows equal-sensitivity lines of the transmitter-receiver derived from FIG. 17A. Comparison of FIG. 16D with FIG. 17B shows that the sensitivity characteristic along the line $h$—$h'$ is more flat thus improving the accuracy of detection of waiting passengers when the transmitter and the receiver are not directed to the same point. It is also seen, on the other hand, by comparing FIG. 16D with FIG. 17C that there is little difference in the sensitivity characteristic along the line $i$—$i'$ between the two cases. Therefore, if the transmitter and the receiver are directed to different points as shown in FIG. 15, the sensitivity characteristic along the line $h$—$h'$ in FIG. 15 is improved while at the same time enlarging the detection region. The equal-sensitivity lines of FIG. 17D are substantially elliptic and it will be obvious that, by arranging a plurality of transmitter-receivers having the above-mentioned sensitivity characteristic, along the line $i$—$i'$ in such a manner that their detection regions overlap one another as shown in FIG. 12, it is possible to improve the sensitivity characteristic in both directions along the lines $h$—$h'$ and $i$—$i'$ in FIG. 15.

Still another embodiment based on the principle shown in FIGS. 17A to 17D will be explained below.

Apart from the aforementioned embodiment employing one receiver for each transmitter to make up a set of transmitter-receiver, the embodiment described below making use of the principle of FIGS. 17 may provide a remarkably enlarged detection region.

In FIG. 18, reference numeral 60 shows an ultrasonic wave transmitter, and numerals 61 and 62 a couple of receivers associated with the transmitter 60 to cover the region of transmission of ultrasonic wave from the transmitter. Reference character C shows a point to which the transmitter 60 is directed, while the receivers 61 and 62 are directed to the points A and B respectively.

The sensitivity characteristics of the transmitter and the receivers shown in FIG. 18 are illustrated in FIG. 19. As already explained, the equal-sensitivity lines are distributed concentrically about the points A, B and C, so that the general detection sensitivity of the transmitter-receiver combination is a product of the sensitivity of the transmitter and that of the receivers.

The sensitivity characteristic curves along the lines $n$—$n'$ and $m$—$m'$ in FIG. 19 are shown in FIGS. 20A and 20B respectively. It will be noted that the sensitivity characteristic curve along the line $n$—$n'$ has a very wide range of uniform sensitivity and a detection region almost twice as large as that for the embodiment of FIG. 17. As will be apparent, it is possible, by constructing the transmitter-receiver combination in the manner described, to detect the number of persons very accurately and uniformly over a wide detection area. It will be seen that addition of one receiver permits a uniform sensitivity characteristics to be achieved over a wide area. Unlike the embodiment under consideration in which a plurality of receivers are provided for each transmitter, a plurality of transmitters may be provided with equal effect for each receiver.

Figure 21:
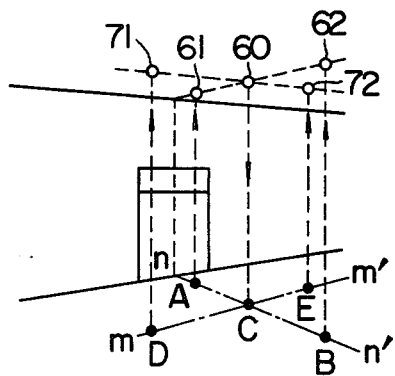

Still another embodiment in which for receivers are provided for each transmitter is shown in FIG. 21, where like component elements are denoted by like reference numerals as in FIG. 18. Numeral 60 shows an ultrasonic wave transmitter, and numerals 61, 62, 71 and 72 ultrasonic wave receivers. Reference character C shows a point to which the transmitter 9 is directed and is similar to the point C in FIG. 18. Characters A, B, D and E show points to which the receivers 61, 62, 71 and 72 are directed respectively. The points A, B, D and E are located the same distance away from the point C.

Figure 22:
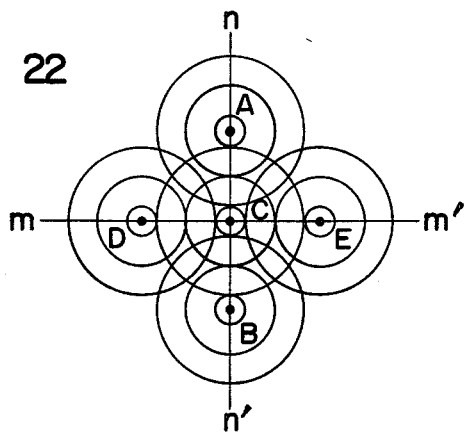

The sensitivity characteristics of the transmitter and receivers of FIG. 21 are shown in FIG. 22. As explained already, the general detection sensitivity of the transmitter-receiver combination is a product of the sensitivity of the transmitter and that of the receivers. In the parts of the region where the sensitivity distributions of the receivers are overlapped, the real detection sensitivity is a sum of the sensitivity of the respective receivers so overlapped.

Figure 23A:
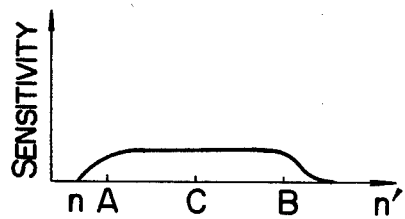
Figure 23B:
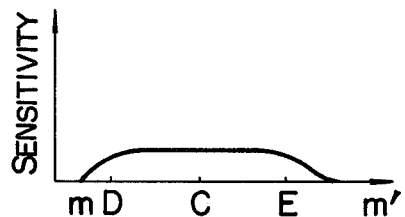

FIGS. 23A and 23B show detection sensitivity characteristics obtained from the sensitivity distribution of FIG. 22. As in FIG. 20, the sensitivity characteristics along the lines $n$—$n'$ and $m$—$m'$ are shown. As will be seen from FIG. 22, the detection sensitivity is symmetric with respect to the lines $n$—$n'$ and $m$—$m'$, and therefore the detection sensitivity curve along the line $m$—$m'$ is identical with that along the line $n$—$n'$. A uniform sensitivity is thus attained over a wide range along both the lines $n$—$n'$ and $m$—$m'$, thereby leading to a remarkably improved detection accuracy as compared with the case of FIG. 16. Also, in view of the fact that receivers are arranged along the line $m$—$m'$, the detection sensitivity characteristic along the line $m$—$m'$ is greatly improved as compared with the characteristic shown in FIGS. 20A and 20B. In addition, the detection region is further almost doubled.

In the aforementioned embodiments, each ultrasonic wave transmitter-receiver is mounted on the ceiling of the elevator hall as shown in FIG. 1B to facilitate the understanding of the invention, but they may alternatively be mounted at the upper side of the elevator door as shown in FIG. 1A.

It is already explained that, unlike the aforementioned embodiments where a plurality of receivers are provided for each transmitter, the apparatus may of course be so constructed that a plurality of transmitters are provided for each receiver. It will also be obvious that a plurality of the above-mentioned transmitter-receivers each including a plurality of transmitters or receiver may be arranged in the manner as described in FIG. 12.

Although the above description is made only with reference to the detection of the number of passengers waiting for elevator cars in an elevator hall, the apparatus according to the invention is of course applicable with equal effect to systems such as for detecting the quantity of articles stored in a warehouse and for other similar purposes.

It will be understood from the foregoing description that according to the invention, in detecting the number of objects by the use of a plurality of ultrasonic wave or microwave transmitter-receivers, they are arranged with their detection regions overlapped one another thereby to generally attain a uniform detection sensitivity over the detection area covered by all the transmitter-receivers, thus making possible a remarkably improved accuracy of the detection. Further, the fact that the detection regions of respective transmitter-receivers are overlapped thereby for positively making use of mutual interference permits a plurality of transmitter-receivers to be driven at the same time. Therefore, even in the case where a multiplicity of transmitter-receivers are installed, they may be energized simultaneously with a single timing signal, while at the same time greatly reducing the time required for detection. Furthermore, by making sure that the transmitter and the receiver in each set of transmitter-receiver are directed to different points in a target plane, the detection region covered by the transmitter-receiver can be enlarged on the one hand and uniform sensitivity characteristics obtained on the other.

By the way, the apparatus may of course be embodied without departing from the spirit and scope of the invention in any degree of overlapping of the detection regions of respective transmitter-receivers. In other words, both slightly and extensively overlapped situations are included in the scope of the invention.

It will also be seen that, unlike the embodiment of FIG. 12 where two sets of ultrasonic wave transmitter-receivers are provided for each elevator car, more sets of ultrasonic wave transmitter-receivers may be installed for each elevator car to make the detection sensitivity more uniform, depending on the area of the elevator hall. However, installation of an unnecessarily large number of transmitter-receivers leads to a high cost. Variations in sensitivity up to a certain degree may be successfully corrected by a proper constitution of a processing circuit in a subsequent stage. Therefore, the number of the sets of the transmitter-receivers should be limited to a proper one which is not unnecessarily large.

Various types of ultrasonic antenna elements including a large type with a large output and a small type with a comparatively low output are commercially available. For the purpose of detection of the number of waiting passengers in the elevator hall as described in the present specification, the resolution of a human body considered from the viewpoint of the speed of the ultrasonic wave signal (about 340 m/s) necessitates a considerably short transmission time of the ultrasonic wave, preferably several milliseconds. When such a short transmission time of the ultrasonic wave is involved, the inertia of the ultrasonic wave oscillator is very influential. An element large in output is large in size and therefore great in inertia, making a considerable period of time required from the application of a voltage thereto till the production of a maximum output. For this reason, during the application time of several milliseconds, the oscillation output of a large element is substantially the same as that of a small element. As a result, the detection region covered by each ultrasonic wave transmitter-receiver is almost constant in the above-described embodiments regardless of the size of the elements employed. The results of an experiment show that the region such as 39 in FIG. 9 preferably measures 2 $m$ by 2 $m$ approximately.

The width of the entrance of a typical elevator car is approximately 2 $m$. In view of this, in order to improve the accuracy of detection of waiting passengers by application of the invention, it is most suitable to provide two sets of ultrasonic wave transmitter-receivers for each elevator car, with their detection regions overlapped each other as shown in FIG. 12.

What we claim is:

1. An apparatus for detecting the number of objects comprising: a plurality of transmitter-receivers, each of said transmitter-receivers including at least one transmitter for transmitting an ultrasonic wave or microwave signal toward the objects and at least one receiver for receiving the ultrasonic wave or microwave signal reflected from the objects, said transmitter-receivers being arranged to have respective detection regions overlapped with each other so that a uniform detection sensitivity may be obtained substantially over a surveillance area of the apparatus, a timing signal generator circuit for simultaneously energizing at least two adjacent transmitter-receivers to obtain a uniform detection sensitivity substantially over at least a portion of said surveillance area, and means for summing and integrating the outputs of the receivers included in said plurality of transmitter-receivers.

2. An apparatus according to claim 1, wherein each of said transmitter-receivers is so arranged that said at least one transmitter and said at least one receiver of each said plurality of transmitter-receivers are directed to different points in a target plane within a range permitting said at least one receiver to receive the reflected ultrasonic wave or microwave signal.

3. An apparatus according to claim 1, wherein each of said transmitter-receivers includes a plurality of receivers and one transmitter.

4. An apparatus according to claim 1, wherein each of said transmitter-receivers includes a plurality of transmitters and one receiver.

5. An apparatus for detecting the number of objects comprising:
a plurality of transmitter-receiver sets, each set including
at least one transmitter for transmitting an ultrasonic wave or microwave signal toward the objects, and
at least one receiver for receiving the ultrasonic wave or microwave signal reflected from the objects, and wherein
each of the at least one transmitter and each of the at least one receiver of each transmitter-receiver set has a respective directivity characteristic, the directivity characteristic of said at least one transmitter and the directivity characteristic of the at least one receiver associated therewith in a respective transmitter-receiver set defining the detection region of that respective set, and wherein
said transmitter-receiver sets are arranged so that respective detection regions overlap each other to permit a uniform detection sensitivity substantially over a surveillance area of the apparatus;
a timing signal generator circuit for simultaneously energizing at least two adjacent transmitter-receiver sets to obtain said uniform detection sensitivity substantially over at least a portion of said surveillance area, each transmitter transmitting the same frequency wave or signal; and
means for summing and integrating the outputs of the receivers of said plurality of transmitter-receiver sets.

6. An apparatus according to claim 5, wherein each set is so arranged that said least one transmitter and said at least one receiver of each set are directed to different points in a target plane within a range permitting said at least one receiver to receive the reflected ultrasonic or microwave signal.

7. An apparatus according to claim 5, wherein each set is made up of plural transmitters and only one receiver.

8. An apparatus according to claim 5, wherein each set is made up of plural receivers and only one transmitter.

9. An apparatus according to claim 5, wherein each respective set is made up of only one respective transmitter and only one respective receiver, said only one respective transmitter and said only one respective receiver defining only said each respective set.

* * * * *